United States Patent
Hanyu et al.

(10) Patent No.: US 7,626,354 B2
(45) Date of Patent: Dec. 1, 2009

(54) HYBRID VEHICLE EQUIPPED WITH A VARIABLE VOLTAGE BATTERY

(75) Inventors: Tomoyuki Hanyu, Yokohama (JP); Kazuhiro Takeda, Yokosuka (JP); Yuki Kosaka, Chigasaki (JP); Hiraku Ooba, Yokohama (JP); Hiroshi Iwano, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 440 days.

(21) Appl. No.: 11/317,675

(22) Filed: Dec. 23, 2005

(65) Prior Publication Data

US 2006/0164034 A1 Jul. 27, 2006

(30) Foreign Application Priority Data

Dec. 24, 2004 (JP) ............................. 2004-373044

(51) Int. Cl.
H02J 7/14 (2006.01)
(52) U.S. Cl. .................. 320/104; 320/123; 903/906; 903/907
(58) Field of Classification Search .................. 320/104, 320/116, 117, 118, 123; 903/906, 907; 180/65.1, 180/65.5, 65.6
See application file for complete search history.

(56) References Cited

U.S. PATENT DOCUMENTS 3,923,116 A * 12/1975 Thomspon et al. ......... 180/65.8
6,253,127 B1 * 6/2001 Itoyama et al. ............ 701/22
6,488,107 B1 * 12/2002 Ochiai et al. ............. 180/65.25
6,569,055 B2 * 5/2003 Urasawa et al. ............ 477/5
2003/0102673 A1 * 6/2003 Nada ..................... 290/40 C

FOREIGN PATENT DOCUMENTS

| JP | H05-236608 A | 9/1993 |
| JP | 2001-329884 A | 11/2001 |
| JP | 2004-104936 A | 4/2004 |

* cited by examiner

*Primary Examiner*—Edward Tso
*Assistant Examiner*—Johali A Torres Ruiz
(74) *Attorney, Agent, or Firm*—Global IP Counselors, LLP

(57) ABSTRACT

To protect the inverters and motor generators from damage caused by abnormal currents resulting from the sudden changes in voltage that occur when changing the battery voltage. A vehicle equipped with an engine 10* and first and second motor-generators 11 and 12 that can generate electricity by being driven by engine 10* or from regeneration of kinetic energy of the vehicle, power supply line 25 that connects first motor-generator 11 with second motor-generator 12, and battery 23 connected via switch 24 in the middle of electric power supply line 25. When changing the voltage of battery 23, switch 24 is opened before the voltage of battery 23 is changed, and switch 24 is closed only after one of the motor generators 11 and 12 is caused to generate electric power or propel the vehicle in order to reduce the difference in voltage between power supply line 25 and battery 23.

27 Claims, 13 Drawing Sheets

HYBRID VEHICLE EQUIPPED WITH A VARIABLE VOLTAGE BATTERY

CROSS-REFERENCE TO RELATED APPLICATIONS

The present application claims priority under 35 U.S.C. § 119 of Japanese Patent Application No. 2004-373044, filed on Dec. 24, 2004, the entire content of which is expressly incorporated by reference herein.

TECHNICAL FIELD OF THE INVENTION

The present invention relates to a hybrid vehicle, in particular, a hybrid vehicle equipped with a battery whose voltage can be changed in steps.

BACKGROUND

As a method of simultaneously achieving high efficiency and high power, which is normally a trade-off relationship in an inverter-controlled motor-generator, a method has been known wherein the voltage of a battery that supplies the power to the motor generator is made variable. According to this method, it is possible to reduce the loss and increase the efficiency of the inverter by using a low battery voltage when the load is low. On the other hand, if high output is required, high power can be generated by using a high battery voltage, thus making it possible to run current through the motor-generator while suppressing the counter electromotive force.

While a method has been devised to make the voltage variable using a DC-DC converter, it requires a reactor and also generates a switching loss so that it presents problems in terms of mountability and efficiency.

A method of making the battery voltage variable by means of switching the connection conditions (serial and parallel connections) of the battery is proposed in the Unexamined Japanese Patent Application Publication No. H5-236608.

However, as was the case in the aforementioned prior art, by simply switching the battery connection condition, abnormal current was generated due to an abrupt change of the voltage thus resulting in possible damage to the inverter, the motor generator, etc.

SUMMARY

The present invention takes such technical problems into account and proposes to provide an improvement by minimizing the abrupt voltage change associated with the change of the battery voltage, thus protecting the inverter, the motor-generator, etc. from damage caused by the abnormal current due to the abrupt voltage change.

The hybrid vehicle pertaining to the present invention is equipped with an engine, first and second motor-generators that can generate electricity either driven by said engine or from regeneration of kinetic energy, a power supply line that electrically connects said first motor-generator with said second motor-generator, and a battery connected via a switch in the middle of said electric power supply line. When changing the battery voltage, said engine's output is modified, the switch is opened before the battery voltage is changed, and closed only after minimizing the voltage difference between the power supply line and the battery by causing at least one of first or second motor generators to generate power or to propel the vehicle.

EXPLANATION OF REFERENCE SYMBOLS

1 Controller
10 Engine
11 Motor-generator
12 Motor-generator
13 Transmission
23 Battery
23a Battery module
23b Battery module
24 Switch
21 Inverter
22 Inverter
25 DC line (power supply line)

DETAILED DESCRIPTION

According to the present invention, the battery voltage is changed after said engine's output is modified and the first and second motor-generators are electrically disconnected from the battery, and they are reconnected only after the difference between the voltages of the power supply line and the battery is reduced, so that abrupt changes of the drive power and the voltage are minimized and generation of abnormal currents is prevented.

Figure 1:
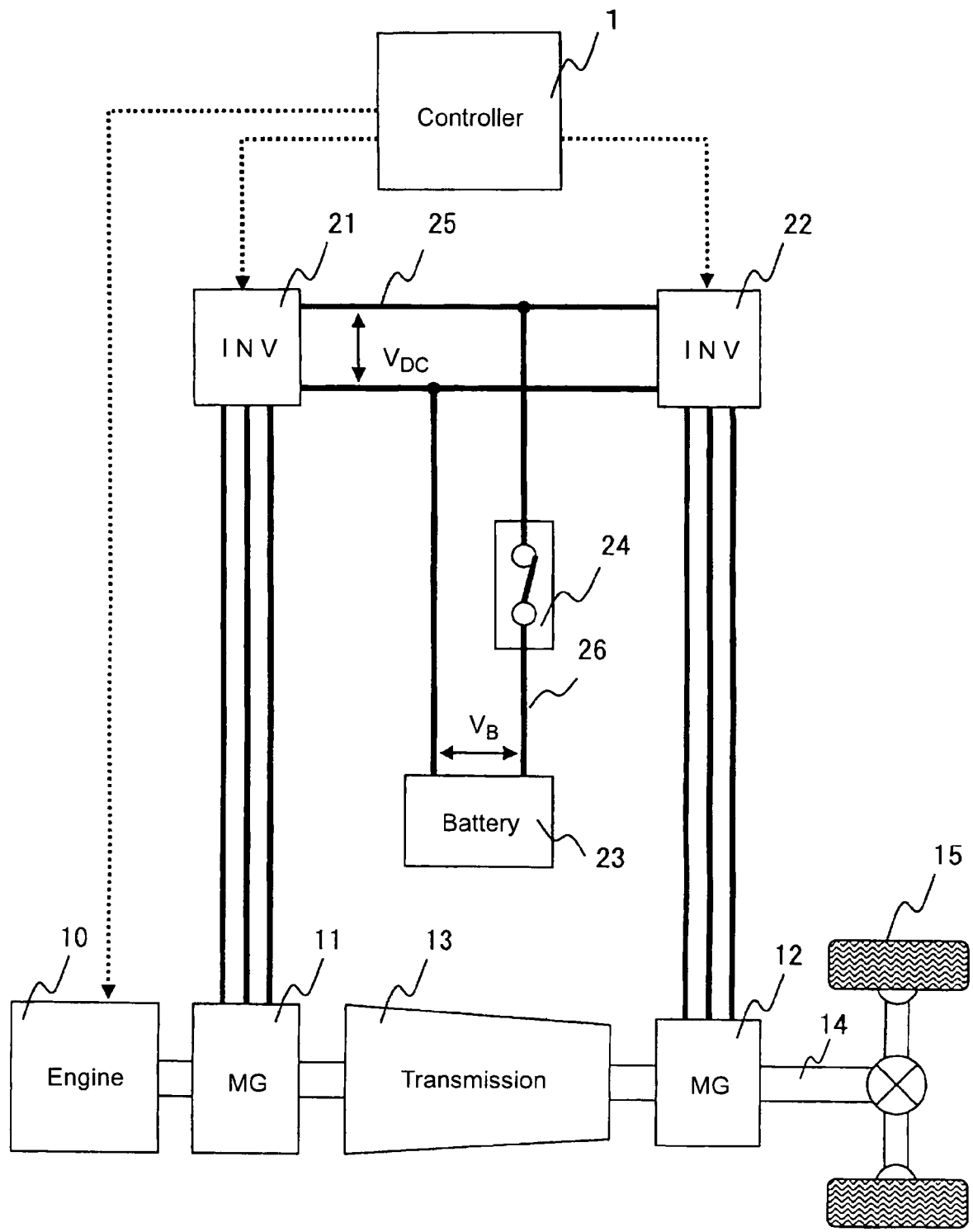
FIG. 1 shows the schematic embodiment of the hybrid vehicle pertaining to the present invention.

The most favorable embodiment of the present invention will be described below with reference to the accompanying Figures FIG. 1 shows the schematic embodiment of a hybrid vehicle pertaining to the present invention. Engine 10 is a prime mover such as an internal combustion engine that generates the driving power to propel the vehicle. Motor generators (hereinafter "MGs") 11 and 12 are electric motors and generate electric power when driven by engine 10 or by regeneration of the kinetic energy of the vehicle. Either MG 11 or 12 can also propel the vehicle by receiving electric power from battery 23 or the other MG. MGs 11 and 12 are controlled by inverters 21 and 22.

The driving power of engine 10 and MG 11 are modified to suit the driving conditions by transmission 13 and transmitted to drive shaft 14 and to driving wheels 15. Drive shaft 14 also transmits the drive power of MG 12. Engine 10, MGs 11 and 12, and transmission 13 are cooperatively controlled by controller 1.

Battery 23 is a battery that exchanges electric power between MGs 11 and 12 and gradually switches the voltage of its output end 26, as described below. Output end 26 of battery 23 is connected in the middle of DC line 25 (power supply line) that connects inverter 21 with inverter 22 via switch 24. When switch 24 is opened, battery 23 can be electrically disconnected from the system (MGs 11 and 12, inverters 21 and 22). While switch 24 is shown schematically in FIG. 1, more specifically, it is constituted as shown in FIG. 2.

Figure 2:
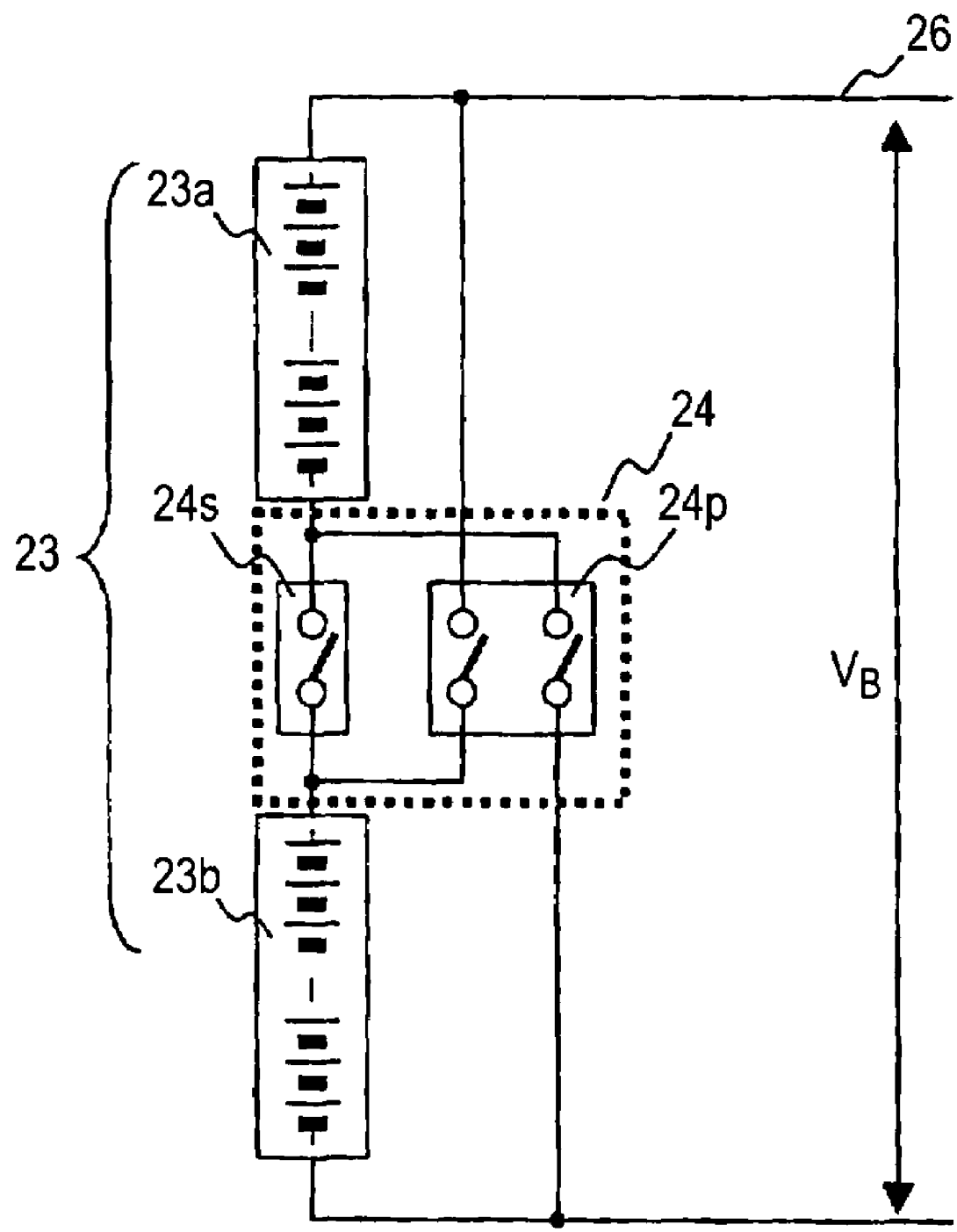
FIG. 2 shows specific embodiments of the batteries and the switches.

FIG. 2 shows specific embodiments of batteries 23 and 24.

Battery 23 comprises two battery modules 23a and 23b. Switch 24 comprises two kinds of switches, 24s and 24p. If either of switches 24s and 24p are opened, switch 24 becomes opened, so that battery 23 becomes electrically disconnected from the system, as described above. The two switches that comprise switch 24p are synchronized to close or open.

Switch 24 also serves as a means to change the output voltage $V_B$ of battery 23. When switch 24s is closed and switch 24p is opened, battery modules 23a and 23b connect with each other in series and voltage $V_B$ of battery 23 increases. Also, when switch 24p is closed and switch 24s is opened, battery modules 23a and 23b connect with each other in parallel and voltage $V_B$ of battery 23 decreases. It is necessary to ensure that switches 24s and 24p are never closed simultaneously and it is preferable that they consist of semiconductor switches.

In order to simplify the following explanations, the parallel connection of battery modules 23a and 23b shall be expressed as "battery 24 is connected in parallel" and the serial connection of them as "battery 24 is connected in series."

Figure 3:
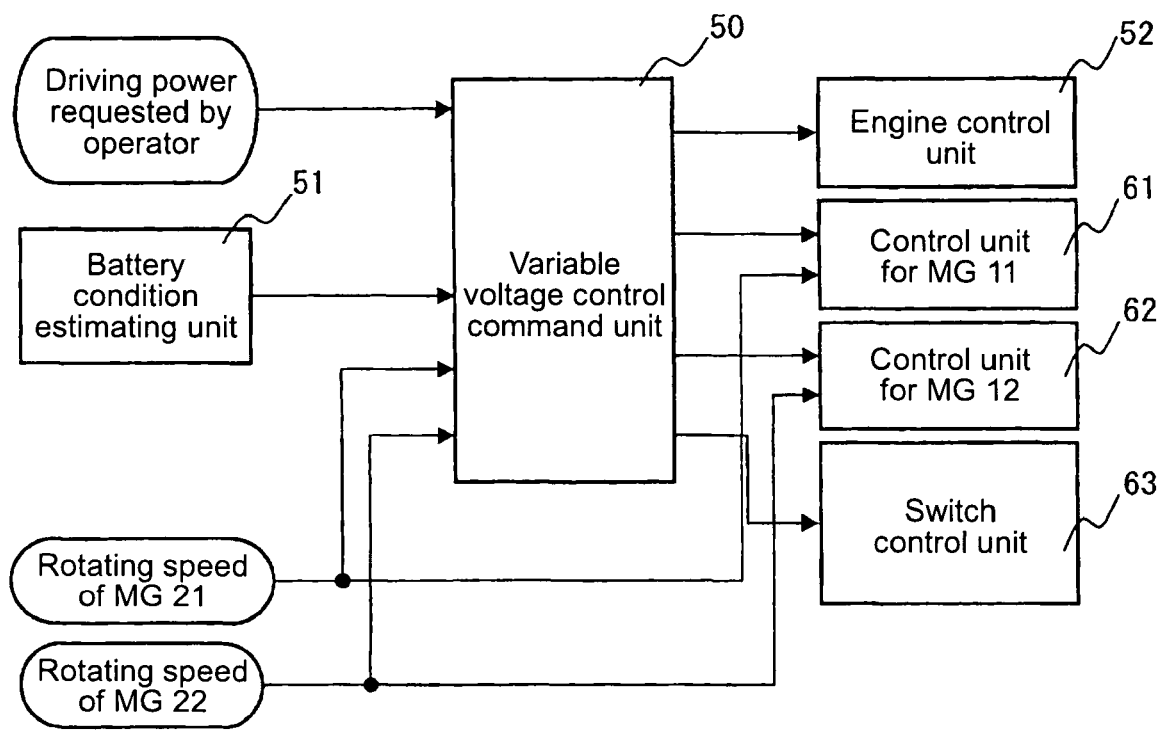
FIG. 3 shows the block diagram of the controller.

FIG. 3 shows specifically the portion concerning the variable voltage control that changes voltage $V_B$ of battery 23 of the control block diagram for controller 1.

Variable voltage control command unit 50 decides on the necessity of changing the battery voltage based on the drive power demanded by the operator, the information from battery condition estimating unit 51, and the rotating speed condition of MG 11 and MG 12, and issues necessary commands to engine control unit 52, control unit 61 for the MG 11, control unit for the MG 12 and switch control unit 63 when it is decided that the voltage change is required.

In general, a magnetic motor generates a counter electromotive force when the rotating speed becomes high and does not generate power if the voltage is low. Therefore, a voltage increase is desirable when the rotating speeds of MG 11 and MG 12 exceed the prescribed value. On the contrary, for a system using an inverter consisting of a semiconductor switch, a higher efficiency can be achieved by reducing the system voltage when running at lower speeds. This is due to the fact that the inverter loss is determined by the system voltage and the current supplied to the MG. Therefore, a lower voltage is desirable when the rotating speeds of MG 11 and MG 12 are lower than the prescribed value.

Battery condition estimating unit 51 detects the condition of battery 23, estimates the maximum charge/discharge power and efficiency in the parallel condition and the serial condition, and transmits the information to variable voltage command unit 50. In general, the battery will provide different output characteristics depending on charge condition and deterioration, so it is necessary to estimate the maximum charge/discharge power and efficiency under the current condition of the battery.

Once it is decided to increase the voltage, variable voltage command unit 50 issues an output modification command to engine control unit 52. At this point, the modification is made in the direction of increasing the output. It also issues a command to control unit 61 of MG 11 and control unit 62 of MG 12 to make the charge/discharge power of battery 23 approximately zero.

When the discharge/charge power of battery 23 becomes approximately zero, it issues a command to switch control unit 63 to open switch 24, and a command to switch control unit 63 to change the connection method of battery 23 so that the voltage of battery 23 is changed, while maintaining switch 24 in an open condition. Furthermore, it issues a command to control unit 61 of MG 11 and control unit 62 of MG 12 to control the operating conditions of MG 11 and MG 12 so that the voltage $V_{DC}$ of DC line 25 becomes equivalent to the battery voltage $V_B$ after the voltage increase.

On the other hand, once it is decided to lower the voltage, it issues a command to control unit 61 of MG 11 and control unit 62 of MG 12 to make the charge/discharge power of battery 23 approximately zero, and issues a command to switch control unit 63 to disconnect battery 23 from the system by opening switch 24, when the charge/discharge power of battery 23 becomes approximately zero. It then issues a command to engine control unit 52 to lower the engine output, and issues a command to control unit 61 of MG 11 and control unit 62 of MG 12 to increase the output of either MG 11 or MG 12 using the power remaining in the system, in coordination with the lowering of the output of engine 10. At this point, the output of either MG 11 or MG 12 is controlled so that the voltage $V_{DC}$ of DC line 25 becomes equivalent to the voltage $V_B$ after the lowering of the voltage.

In either case, switch 24 is opened after the charge/discharge voltage of battery 24 is made approximately zero, and the voltage $V_B$ of battery 23 is changed after switch 24 is opened in order to change the output of battery 23. The voltage change process for battery 23 is completed by causing at least one of MG 11 or MG 12 to generate electricity or propel the vehicle in order to reduce the voltage difference between DC line 25 and battery 23, and then closing switch 24 as the voltage difference is reduced.

The contents of the variable voltage control of controller 1 mentioned above will be described in further detail with reference to the time chart and the control flow.

Figure 4:
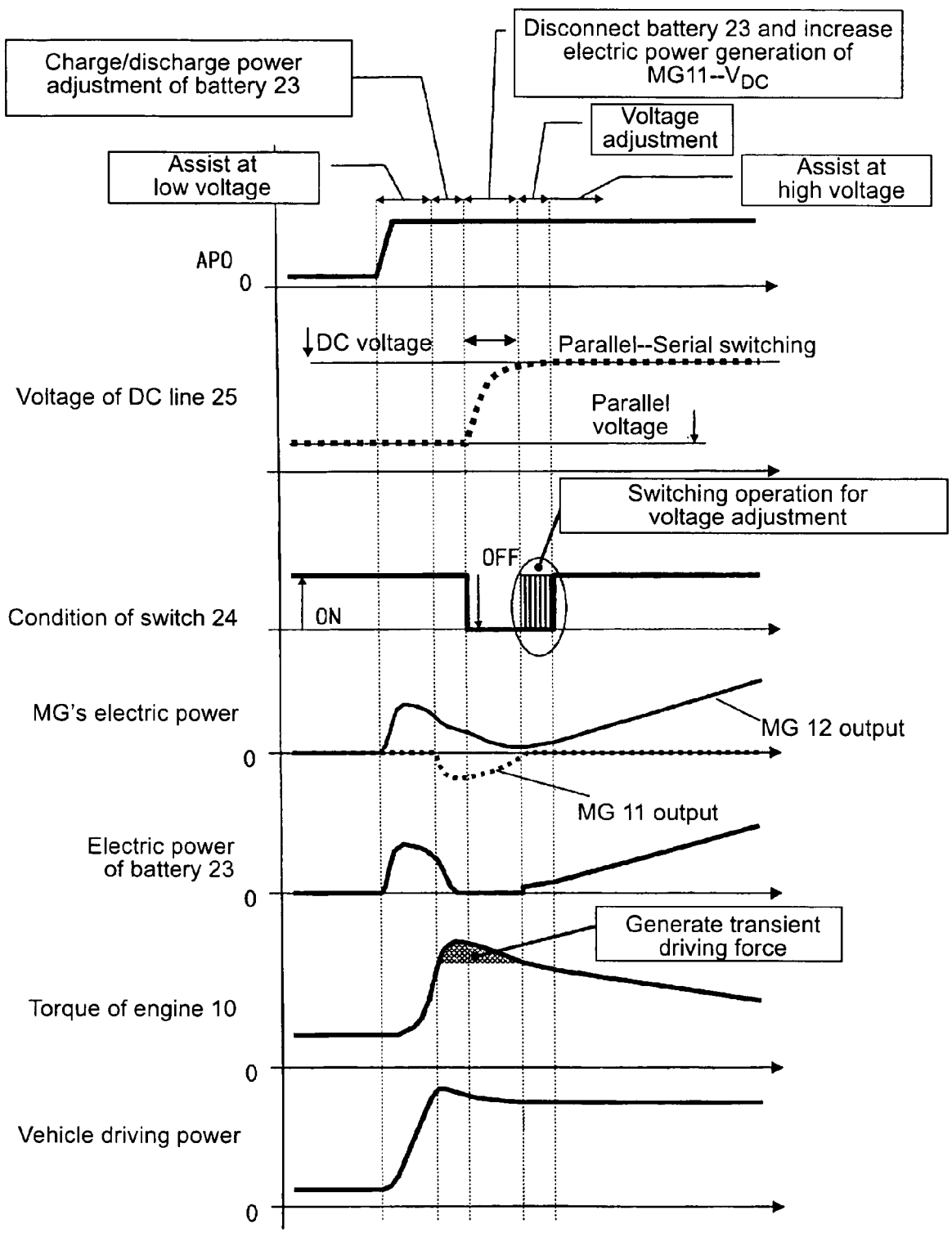
FIG. 4 is a time chart showing the system performance when the voltage increase control is performed.

FIG. 4 is a time chart showing the system performance under the voltage increase control. FIG. 4 shows a case where the operator increases the power required so that the assistance of high power battery 23 is required.

If the operator's accelerator pedal operation (APO), which represents the operator's demand for the driving power varies greatly, thus demanding a larger driving power, variable voltage control command unit 50 decides to increase the voltage and issues a command to engine 10 requesting it to transitionally increase its torque. The torque of engine 10 can be transitionally increased by various methods, for example, changing the ignition period, increasing the fuel supply, increasing the supercharge pressure in case of a supercharged engine, etc. Compared to electric motors, engine 10 has a slower response so that the assistance of MG 12 is maintained at a lower voltage until the driving power of engine 10 rises to the required level.

As the driving power of engine 10 rises, the assistance of MG 12 is reduced accordingly. In addition, the driving power of the vehicle is estimated in order to predict the timing for when the torque of engine 10 becomes excessive transitionally, and the electric power generation control by MG 11 starts in coordination with such an excess timing. The upper limit of the electric power generation of MG 11 is determined by the total sum of the excess torque of engine 10. As the electric power generation of MG 11 increases, the electric discharge from battery 23 decreases. When the electric discharge from battery 23 becomes approximately zero, switch 24 is controlled to disconnect battery 23 from the system. Since battery 23 is disconnected while the power supply from the battery 23 is small, an extreme drop in voltage of the DC line or generation of abnormal current does not occur after it is disconnected.

After battery 23 is disconnected, the electric power generation of MG 11 is increased and the driving power of MG 12 is reduced, so that the surplus electric power generated by MG 11 causes an increase in the voltage of DC line 25. Since inverters 21 and 22 contain smoothing capacitors and the electric charge increases in parallel with the increase of the electric power generation, the terminal voltages of their inverters rise. Meanwhile, battery 23 prepares for switching from the parallel connection to the serial connection.

As the voltage of DC line 25 becomes closer to the serial connection voltage of battery 23, switch 24 is operated to initiate connecting battery 23 with the system. Since the voltage difference between DC line 25 and battery 23 has become sufficiently small, no excessive current occurs that can damage the system at the time of connection. In addition, since the switching of switch 24 further adjusts the voltage to compensate for the minute voltage difference, a safer connection of battery 23 can be achieved.

After battery 23 is connected, electric power is supplied from battery 23, which is now serially connected to MG 12 at a higher voltage, to provide sufficient assist power.

Figure 5:
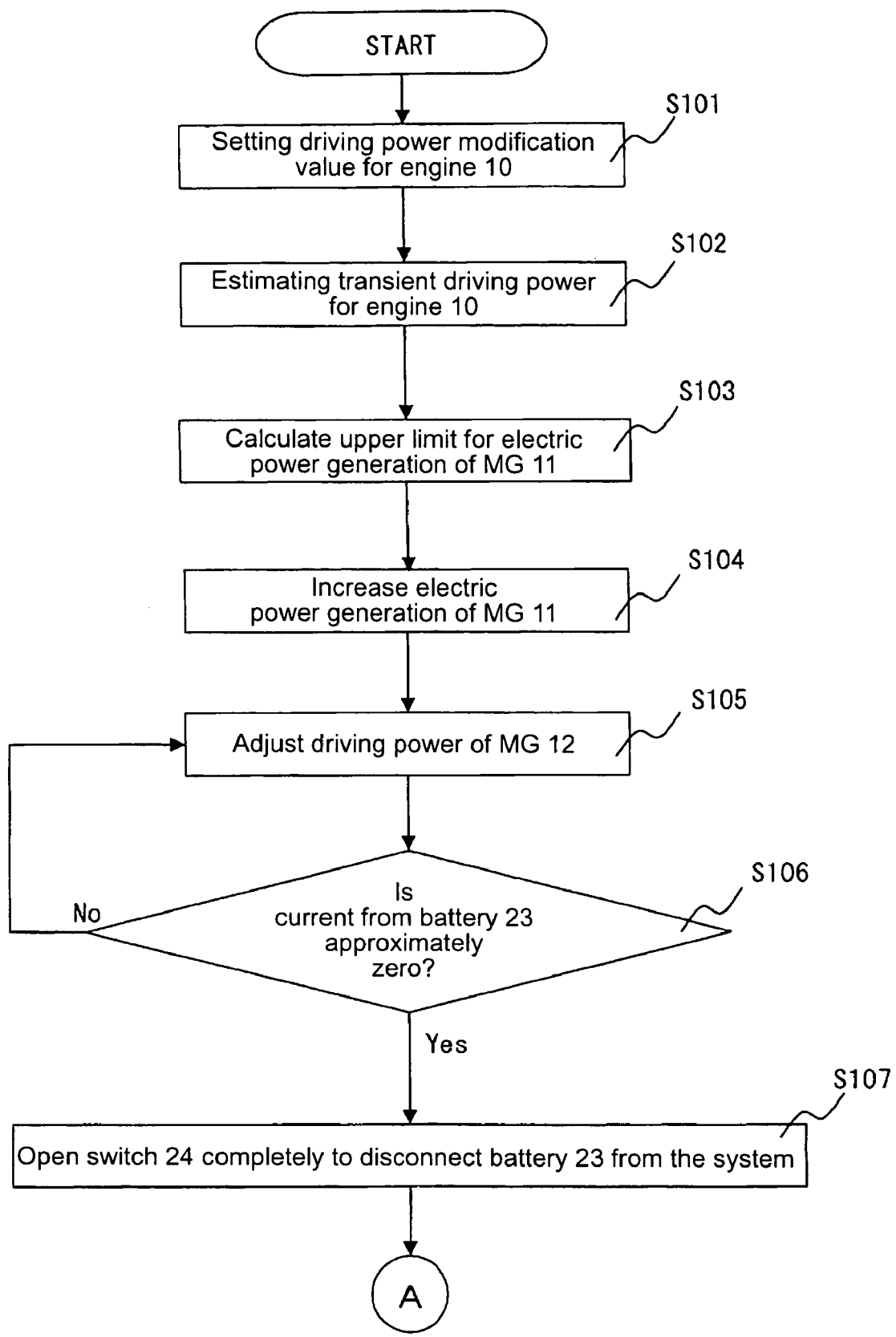
FIG. 5 is a flowchart showing the contents of the voltage increase control.
Figure 6:
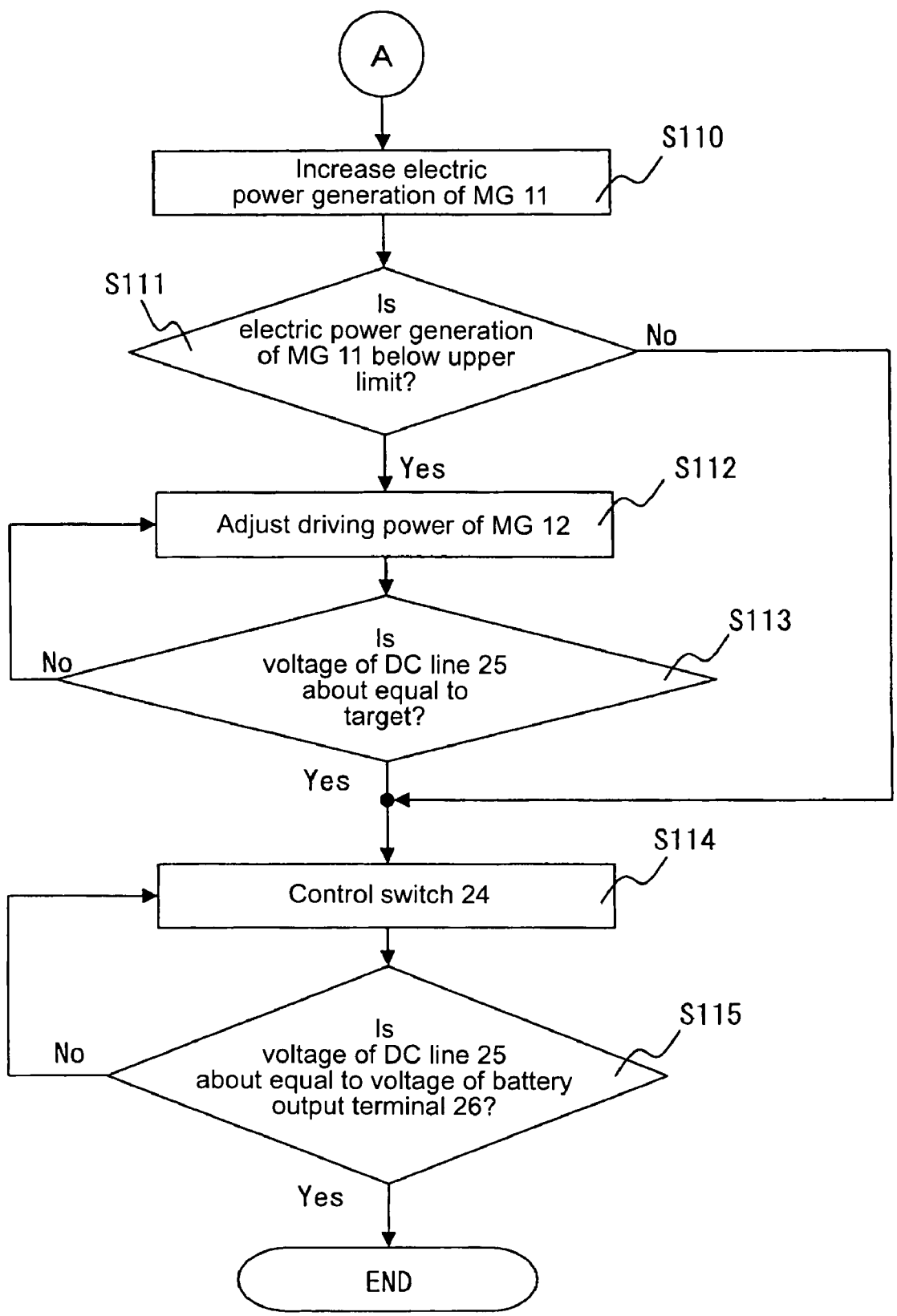
FIG. 6 is also a flowchart showing the contents of the voltage increase control.

FIG. 5 and FIG. 6 represent the control flow of the voltage increase control shown in FIG. 4, which is executed by controller 1. This flow is executed when a voltage increase request is issued by variable voltage control command unit 50 upon receiving the increase of the accelerator pedal operation (APO).

In the flowchart, a driving power modifying value is set in step S101 to indicate how much the drive power of engine 10 is to be increased in response to the increase of the acceleration pedal operation (APO).

In step S102, the generation timing and energy of the excessive driving power of engine 10 are estimated based on the modification amount set in step SI 01.

In step S103, the upper limit of the electric power generation of MG 11 is calculated from the value estimated in step S102.

Up to this point, it is assumed that MG 12 is providing assistance at a low voltage.

In step S104, the electric power generation control of MG 11 is initiated to increase the power generation of MG 11 timed with the timing of excessive driving power generation at engine 10 as estimated in step S102.

The assist power of MG 12 is adjusted in step S105. As this point, the torque of MG 12 is controlled to make the current from battery 23 zero.

A decision is made in step S106 as to whether the current from battery 23 is approximately zero. If the decision is affirmative, the program goes to step S107.

In step S107, switch 24 is controlled to disconnect battery 23 from the system. Since there is almost no electric power being transmitted between battery 23 and the system, no abnormal current is generated even when switch 24 disconnects the battery.

After battery 23 is disconnected in step S107, the program moves on to step S110 shown in FIG. 6 to increase the electric power generation of MG 11.

In step S111, the electric power generation of MG 11 is checked and it is determined whether it has reached the upper limit of the electric power generation of MG 11 set at step S103. If the electric power generation of MG 11 is less than the upper limit, the program moves on to step S112. If it has reached the upper limit, the program moves on to step S114.

The drive power of MG 12 is adjusted in step S112. At this point, the torque of MG 12 is controlled so that the voltage of DC line 25 rises up to the target value. The target value of the voltage of DC line 25 is set to equal the output terminal voltage after battery 23 is switched to the serial connection.

In step S113, the voltage of DC line 25 is decided. When the voltage of DC line 25 almost reaches the target value, the program moves to step S114. At this point, battery 23 is already switched to the serial connection.

In step S114, switch 24 is operated to initiate the connection of battery 23 with the system. Due to the cooperative control of engine 10 and MGs 11 and 12, the voltage of DC line 25 is already raised to about the same level as the output terminal voltage of battery 23, so that no abnormal current runs that would damage the system when switch 24 is operated to initiate the connection.

In step S115, the voltage of DC line 25 is compared with the voltage of battery 23 in order to control the switching operation of switch 24. When the two voltages become equal, the switching operation is terminated to completely connect switch 24 and end the voltage increase control.

Since the voltage increase control is conducted using the cooperative control of engine 10 and MGs 11 and 12, the voltage increase of battery 23 can be done safely without using a large capacitor or a DC-DC converter. Moreover, although a loss in exchange of electric power occurs between MG 11 and MG 12 due to the execution of this control, it is possible to suppress the change of the vehicle drive power to a level that does not cause any uncomfortable sensation to the operator due to the high responsiveness of MGs 11 and 12.

Figure 7:
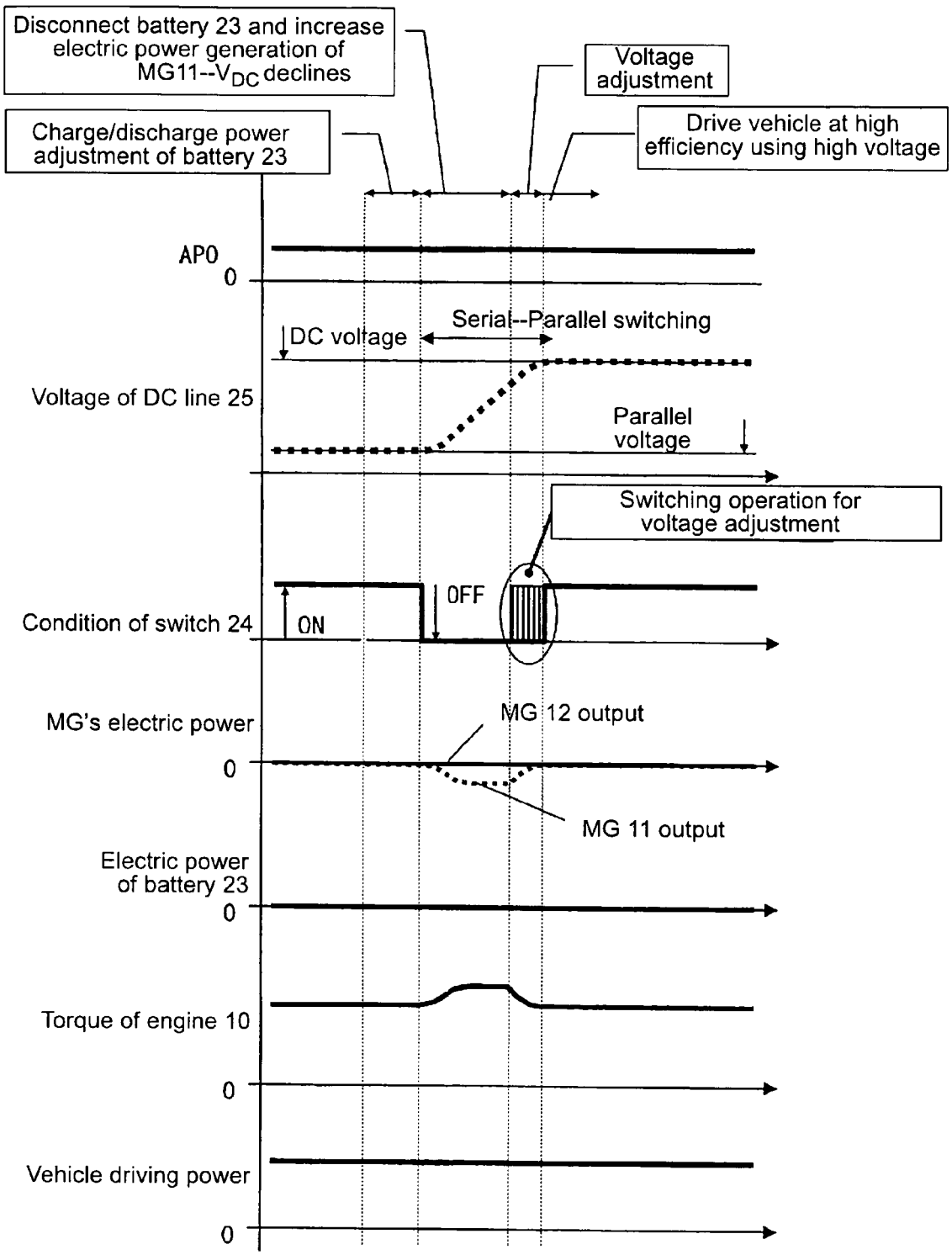
FIG. 7 is a time chart showing the system performance for the voltage increase control under a different circumstance.

FIG. 7 is a time chart showing the outline of the operation during the voltage increase control in another circumstance. An explanation is provided of a case in which it becomes necessary to suppress the counter electromotive force by raising the battery voltage due to an increase in the rotating speed of MG 12.

FIG. 7 shows the condition in which the vehicle is running at a slow constant speed. As the speed increases, the rotating speed of MG 12 connected to vehicle drive shaft 14 increases as well. As the rotating speed of MG 12 increases, so does the counter electromotive force, so that the weaker field current for maintaining zero torque increases and the efficiency deteriorates. Therefore, the voltage of battery 23 is raised to improve the system efficiency.

Since there is no acceleration or deceleration demand by the operator, it is necessary to execute the voltage increase control so as to avoid giving the operator any uncomfortable sensation. In a steady state, the energy necessary to increase the voltage of DC line 25 can be estimated relatively easily from the characteristics of the capacitors in inverters 21 and 22.

When the voltage increase command is issued by variable voltage control command unit 50, the output of engine 10, MG 11 and MG 12 is adjusted to make the charge/discharge electric power of battery 23 zero. Then, when the electric discharge from battery 23 becomes approximately zero, switch 24 is controlled to disconnect battery 23 from the system. Since battery 23 is disconnected while the power supply from battery 23 is small, an extreme drop in voltage of the DC line or generation of abnormal current does not occur after it is disconnected.

After disconnecting battery 23, the voltage of DC line 25 is increased by increasing the electric power generation of MG 11 while increasing the torque of engine 10. At this time, MG 12 is under zero torque control. Meanwhile, battery 23 is switched from the parallel connection to the serial connection.

When the voltage of DC line 25 becomes closer to the serial connection voltage of battery 23, switch 24 is operated to initiate connecting battery 23 with the system. Since the voltage difference between DC line 25 and battery 23 is sufficiently small, no excessive current occurs that could damage the system at the time of connection. Since the switching of switch 24 further adjusts the voltage to compensate for the minute voltage difference, a safer connection of battery 23 can be achieved.

The torque of engine 10 is reduced simultaneously with the adjustment of the voltage, and the electric power generation of MG 11 is terminated. After connecting battery 23, it remains in a high voltage state and the vehicle can be driven with high efficiency.

Figure 8:
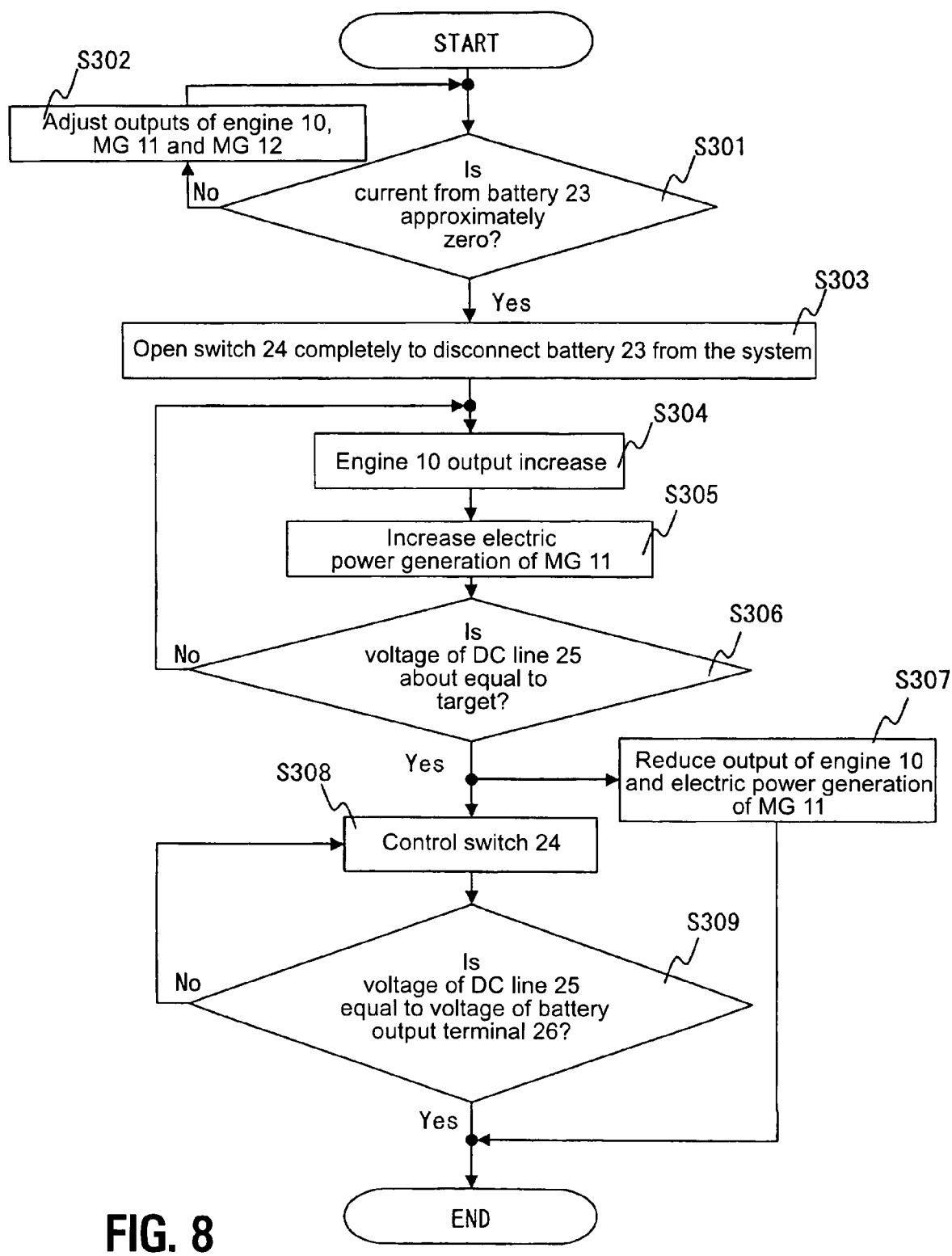
FIG. 8 is a flowchart showing the contents of the voltage increase control.

FIG. 8 represents the control flow of the voltage increase control shown in FIG. 7, which is executed by controller 1. This flow is executed when the voltage increase request is issued by variable voltage control command unit 50 as a result of the increase in the rotating speed of MG 12.

According to this flowchart, first in step S301, it is determined whether or not the charge/discharge current of battery 23 is zero. If said current is not zero, the program advances to step S302, and the output of engine 10, MG 11 MG 12 are adjusted to make the charge/discharge current of battery 23 closer to zero.

In step S303, switch 24 is operated to disconnect battery 23 from the system.

In step S304, the output of engine 10 is increased.

In step S305, the electric power generation control of MG 11 is initiated in sync with the output increase of engine 10 in order to increase the electric power generation of MG 11. At this point, a smooth shift to the electric power generation state can be achieved by suppressing the change of the output of engine 10, which is slower to respond, to a level that does not cause any uncomfortable sensation to the operator. Also, battery 23 is switched from the parallel connection to the serial connection.

In step S306, it is determined whether or not the voltage of DC line 25 is close to the target value. The target value is set to be equivalent to the serial connection voltage. If the voltage of DC line 25 is lower than the target value of battery 23, the program returns to step S304 to increase the output of engine 10. When the voltage of DC line 25 is close to the target value, the program moves to step S307.

In step S307, the reduction of the output of engine 10 and the electric power generation of MG 11 are started.

In step S308, switch 24 is operated to initiate the connection of battery 23 with the system.

In step S309, the voltage of DC line 25 is compared with the voltage of battery 23, the switching of switch 24 is controlled, and switch 24 is completely connected when the two voltages become equal, thus completing the voltage increase control.

Figure 9:
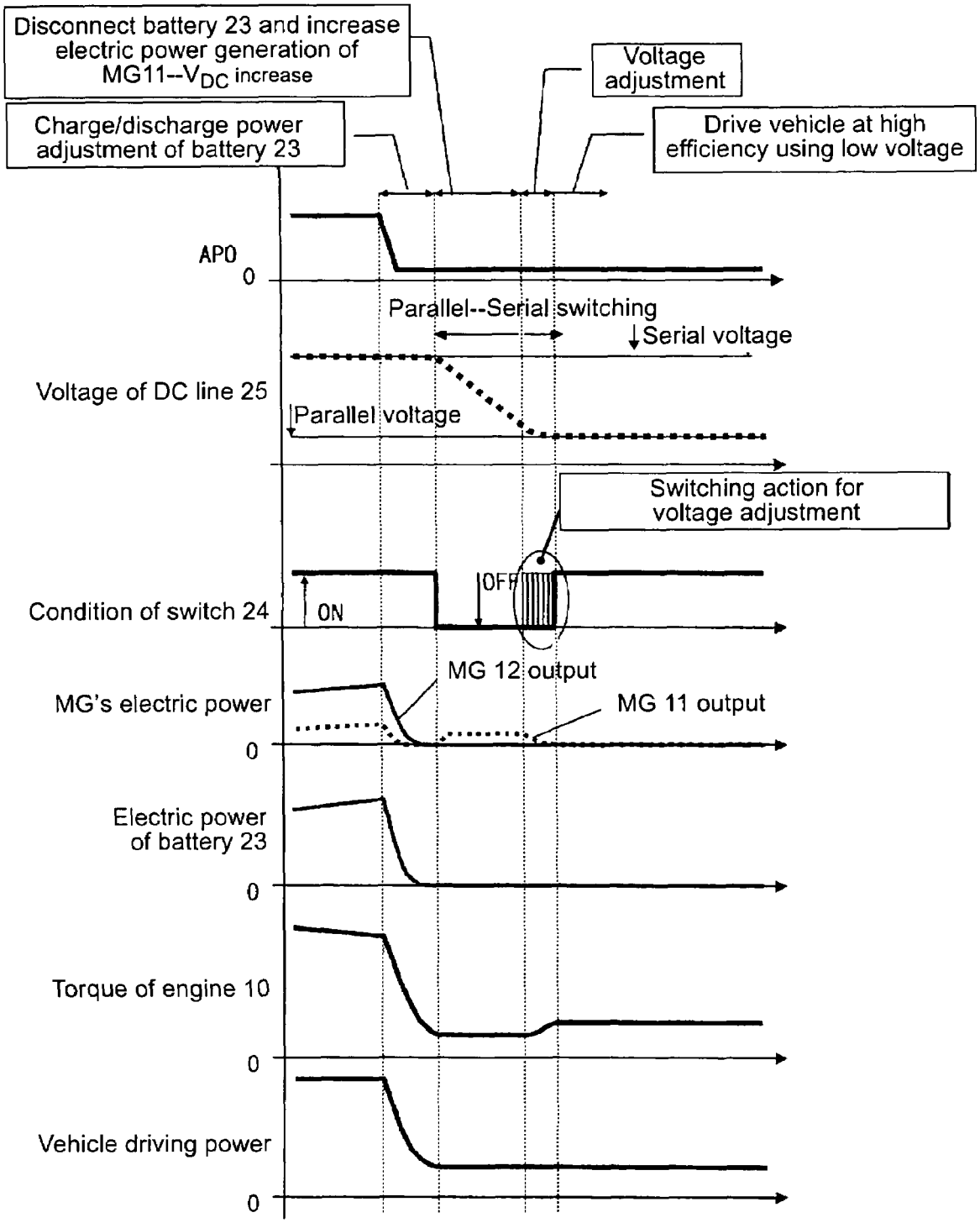
FIG. 9 is a time chart showing the system performance under the voltage decrease control.

FIG. 9 is a time chart showing the system's performance when the voltage reduction control takes place. The following is an explanation for shifting into a low voltage/high efficiency state as a result of lowering of the operator's drive power demand.

When the operator's driving power demand decreases and both MG 11 and MG 12 are running at low speeds, the system voltage is changed to a lower voltage in order to minimize the inverter loss. The voltage reduction control is initiated after the driving powers of engine 10, MG 11 and MG 12 are lowered to the required values upon receiving the operator's demand for lowering the driving power.

When the voltage decrease command is issued by variable voltage control command unit 50, the output of engine 10, MG 11 and MG 12 are adjusted to make the charge/discharge electric power of battery 23 zero. When the electric discharge from battery 23 becomes approximately zero, switch 24 is opened to disconnect battery 23 from the system.

After battery 23 is disconnected, the drive power of MG 11 is increased while reducing the torque of engine 10, thus consuming the electric charges accumulated in the capacitors of inverters 21 and 22 and lowering the voltage of DC line 25. At this point, MG 12 is under zero torque control.

Meanwhile, battery 23 is switched from the serial connection to the parallel connection.

When the voltage of DC line 25 becomes closer to the parallel connection voltage of battery 23, switch 24 is operated to initiate the connection of battery 23 with the system. Since the voltage difference between DC line 25 and battery 23 is sufficiently small, no excessive current occurs that could damage the system at the time of connection. Since the switching of switch 24 further adjusts the voltage to compensate for the minute voltage difference, a safer connection of battery 23 can be achieved.

The torque of engine 10 is increased simultaneously with the adjustment of the voltage, and the drive by MG 11 is terminated. After battery 23 is connected, the vehicle can be run with high efficiency, while maintaining a lower voltage condition.

Figure 10:
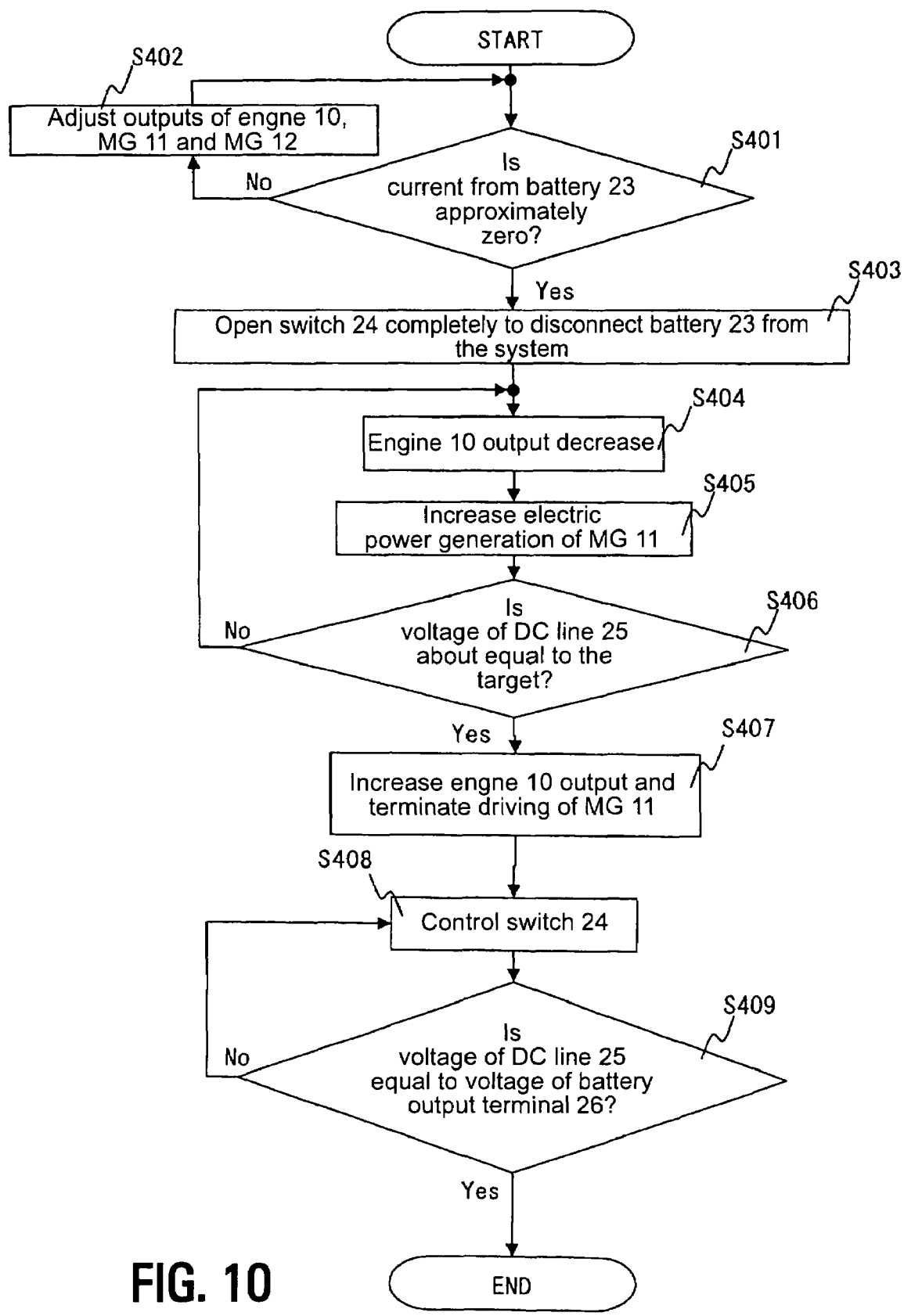
FIG. 10 is a flowchart showing the contents of the voltage decrease control.

FIG. 10 represents the control flow of the voltage reduction control shown in FIG. 9, which is executed by controller 1. The operation shown in this flowchart is executed when the operator's demand for the driving power decreases, and variable voltage control command unit 50 issues a voltage reduction command.

According to this flowchart, in step S401, it is determined whether or not the current from battery 23 is approximately zero. If said current is not zero, the program goes to step S402 to adjust the output from engine 10, MG11, and MG 12 until the current from battery 23 becomes approximately zero.

In step S403, switch 24 is opened to disconnect battery 23 from the system.

In step S404, the output of engine 10 is reduced.

In step S405, the drive power of MG 11 is increased and the voltage $V_{DC}$ of DC line 25 is decreased in synchronization with the decrease in the power of engine 10. At this point, since switch 24 is open, electric power cannot be supplied to MG 11 from battery 24, but it is possible to drive MG 11 by consuming the electrical charge accumulated in the capacitor of inverter 21 and to decrease the voltage $V_{DC}$ of DC line 25. Also, the connection of battery 23 is changed from the serial connection to the parallel connection and the voltage $V_B$ of battery 23 is decreased.

In step S406, it is determined whether or not the voltage of DC line 25 is close to the target value. The target value is set to be equivalent to the voltage of battery 23 after voltage reduction takes place. If the voltage $V_{DC}$ of DC line 25 is higher than the target value, the program returns to step S404, the drive power of MG 11 is further increased while the output of engine 10 is further reduced, thus reducing the voltage $V_{DC}$ of the DC line 25. When the voltage $V_{DC}$ of DC line 25 is close to the target value, the program moves to step S407.

In step S407, the system starts to increase the output of engine 10 and the electric power generation of MG 11.

In step S408, switch 24 is operated to initiate the connection of battery 23 with the system.

In step S409, the voltage of DC line 25 is compared with the voltage of battery 23, the switching of switch 24 is controlled, and switch 24 is completely connected when the two voltages become equal, thus completing the voltage increase control.

The following is a summary of the operating effects of the embodiments pertaining to the present invention, as described above.

For the hybrid vehicle pertaining to the present invention, in order to change the voltage of battery 23, first, switch 24 is opened, the voltage of DC line 25 is made closer to the voltage of battery 23 by adjusting the output of at least one of MGs 11 and 12, and switch 24 is closed after reducing the difference between the voltages of DC line 25 and battery 23. The change of the battery voltage is performed while MGs 11 and 12 are electrically disconnected from battery 23 and they are reconnected after the voltage difference between DC line 25 and battery 23 is reduced, so that there is no possibility of an abrupt change in voltage, thus protecting inverters 21 and 22 as well as MGs 11 and 12 from damage due to the occurrence of abnormal currents.

When changing the voltage to the higher side, the output of engine 10* is increased and at least one of MGs 11 and 12 is caused to generate electric power. On the other hand, when changing the voltage to the lower side, the output of engine 10* is reduced and at least one of MGs 11 and 12 is caused to propel the vehicle. Thus, it is possible to suppress the fluctuations in the driving power when changing the voltage of the battery.

Also when changing the voltage, by adjusting the output of at least MG11 or MG12 before opening switch 24 and thus reducing the charge/discharge current of battery 23, the change in voltage that occurs when switch 24 is opened in order to disconnect battery 23 from the system can be suppressed.

This type of variable voltage battery 23 can be constituted of a plurality of battery modules 23*a* and 23*b* that can be switched between the serial connection and the parallel connection, which is advantageous from the standpoint of mounting capability and efficiency, compared to an embodiment using a DC-DC converter that requires a reactor and in which generates a switching loss occurs.

Moreover, if switch 24 consists of a semiconductor switch and it performs the switching operation when switch 24 is closed, it is possible to control the voltage when switching is performed even if a voltage difference still remains and to suppress an abrupt change in voltage.

The embodiment described above is intended to show only one example of embodiments that can be applied to the present invention and the present invention is not limited to the embodiment described above.

Figure 11:
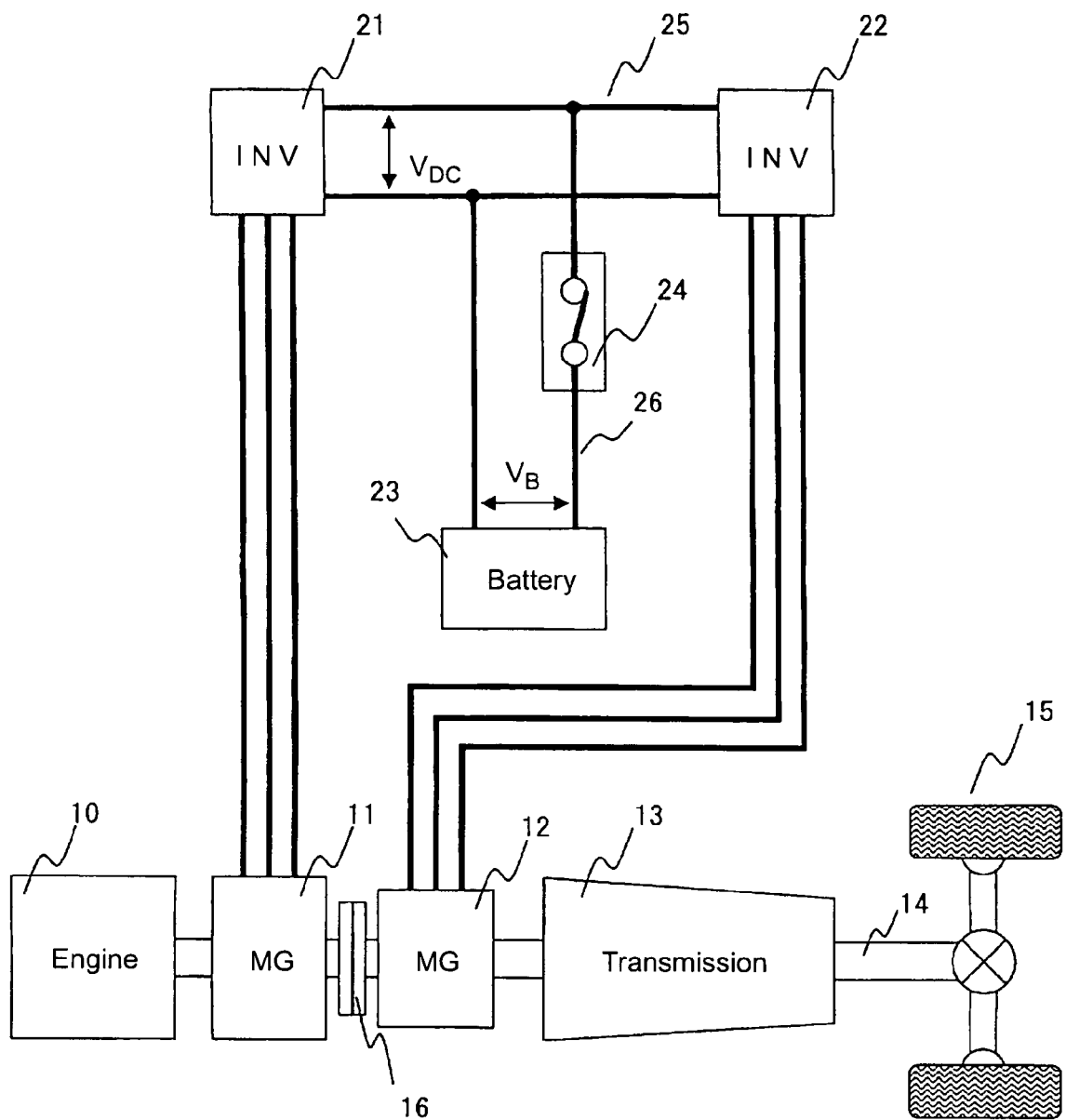
FIG. 11 shows another type of hybrid vehicle to which the present invention can be applied.

For example, in the embodiment shown in FIG. 11, clutch 16 is provided between MG 11 and MG 12. Clutch 16 transmits or cuts off the driving power from engine 10 and MG 11. This type of embodiment is also applicable to the variable voltage control pertaining to the present invention. Particularly for the embodiment shown in FIG. 11, since MG 11 and MG 12 run at the same rotating speed, it is possible to determine the voltage increase from the rotating speed of MGs 11 and 12 and realize the realize the effects of a voltage increase when causing MGs 11 and 12 to generate electric power in order to increase the voltage of DC line 25.

Figure 12:
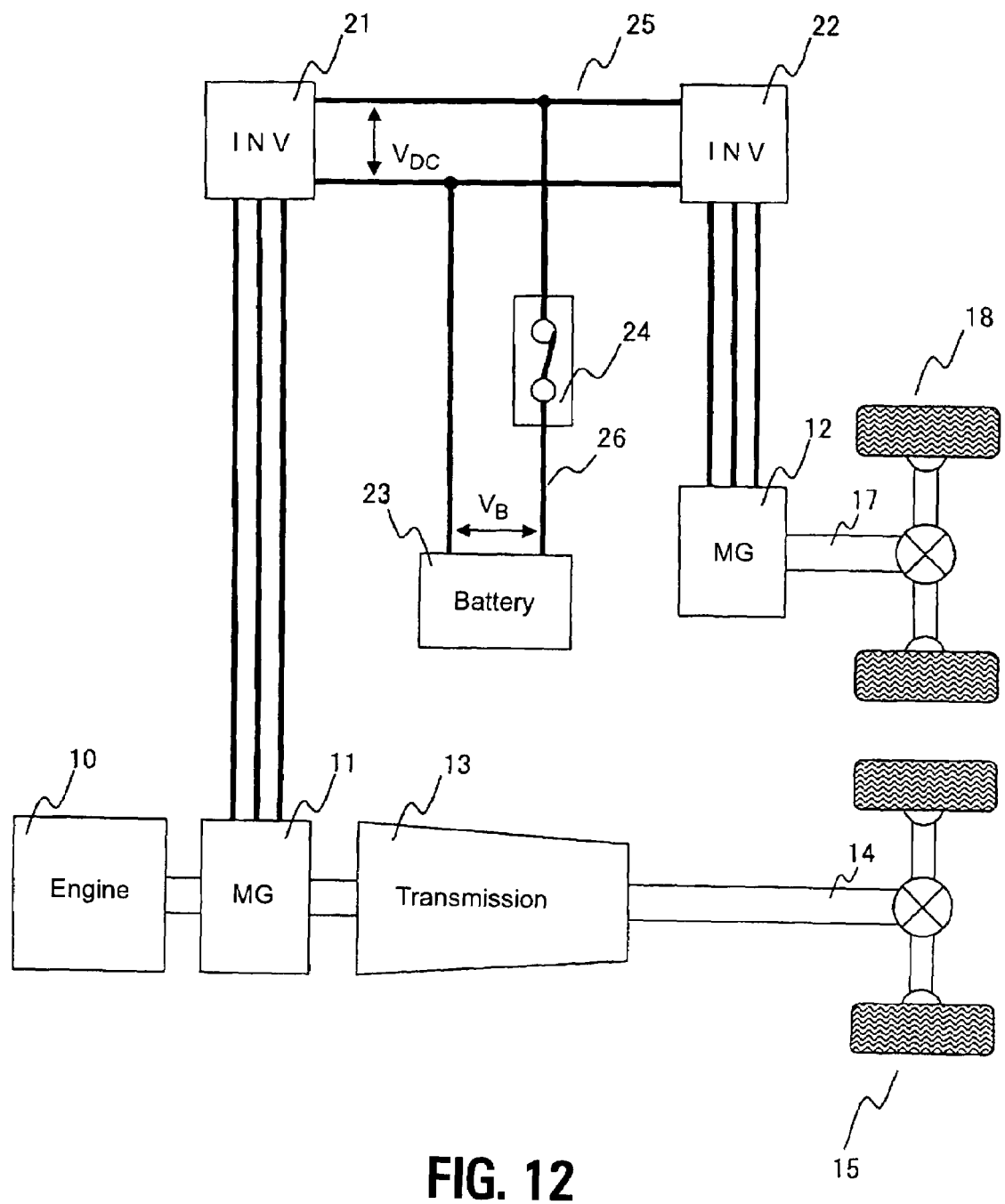
FIG. 12 shows another type of hybrid vehicle to which the present invention can be applied.

FIG. 12 shows an electric four-wheel drive vehicle in which MG 12 transmits the driving power to second set vehicle driving wheels 18 via second vehicle drive shaft 17. This type of embodiment can also be applied to the variable voltage control pertaining to the present invention. For example, if first vehicle drive wheels 15* driven by engine 10 were to slip, the electric power generation control by MG 11 reduces the drive power, and a portion of the electric power thus generated increases the voltage of DC line 25 in order to change the voltage of battery 23 to the higher voltage side. After the voltage is increased, the output of battery 23 and the electric power generated by MG 11 are supplied to MG 12, thus enabling the high output drive of second vehicle drive wheels 18.

Figure 13:
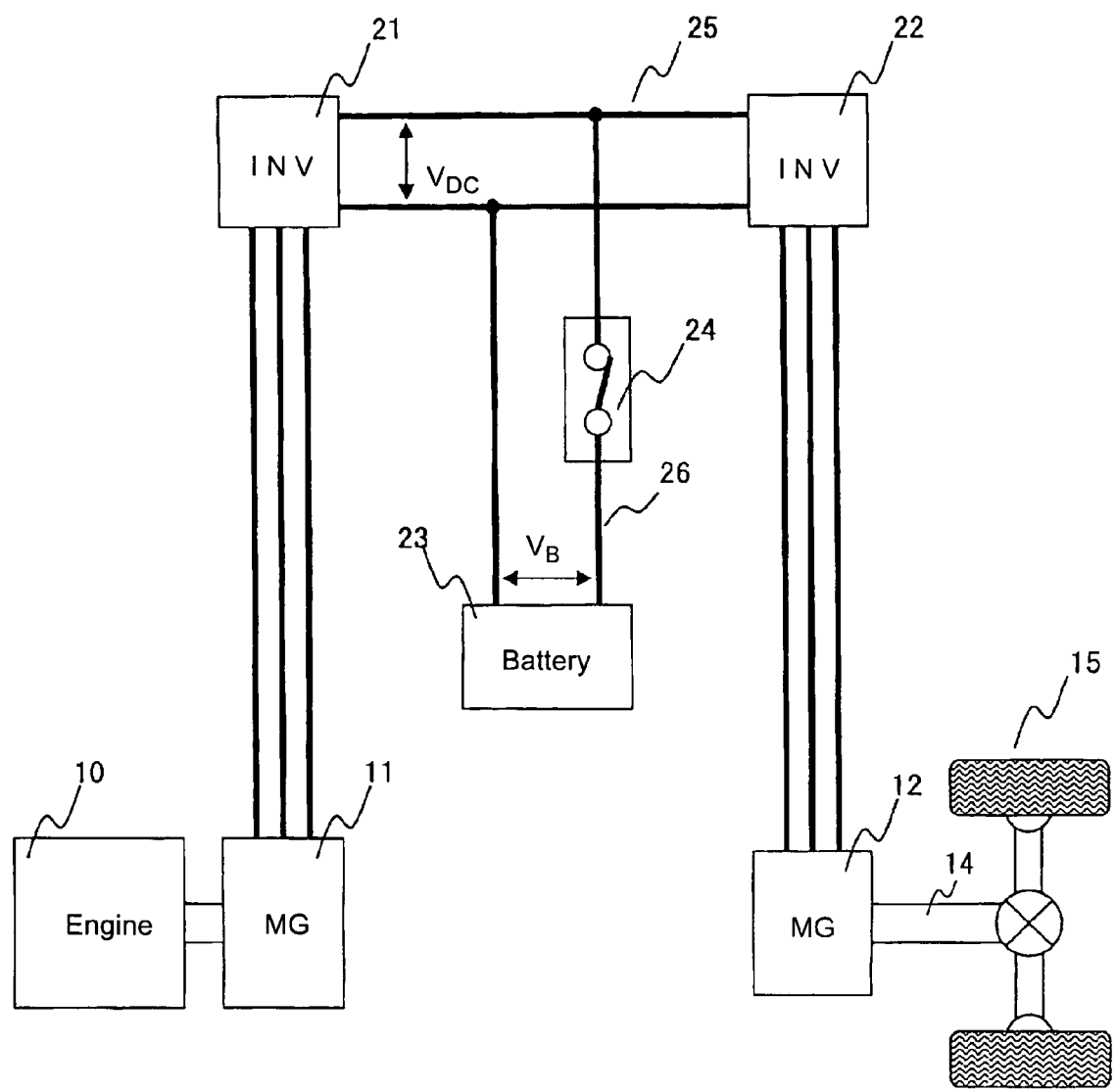
FIG. 13 shows another type of hybrid vehicle to which the present invention can be applied.

FIG. 13 shows a series hybrid that has no mechanical power transmission route between MG 11 and MG 12. This type of embodiment can also be applied to the variable voltage control pertaining to the present invention. Since the drive power of engine 10 does not have a direct impact on the vehicle, there is a great deal of freedom in setting the excess drive power of engine 10, and the voltage of DC line 25 can also be controlled more freely.

CONCLUSION

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A hybrid vehicle comprising:
    an engine;
    first and second motor generators arranged to generate electricity by being driven either by the engine or from regeneration of kinetic energy;
    a power supply line that electrically connects the first motor generator with the second motor generator;
    a battery configured to change a voltage of the battery in steps and connected via a switch to the electric power supply line; and
    a variable voltage control configured
        to adjust an output of at least one of the first and second motor generators before opening the switch such that a charge/discharge current of the battery approaches zero,
        to open the switch to change the voltage of the battery in response to adjusting the output of at least one of the first and second motor generators, and
        to modify an output of the engine based on an amount of change made in the voltage of the battery in response to opening the switch, with the variable voltage control being further configured to close the switch after minimizing a voltage difference between a voltage of the power supply line and the voltage of the battery by adjusting an output of at least one of the first and second motor generators.

2. The hybrid vehicle of claim 1, wherein
    the variable voltage control controls the output of at least one of the first and second motor generators such that the voltage of the power supply line becomes equal to the voltage of the battery after a change made in the voltage of the battery.

3. The hybrid vehicle of claim 1, wherein
the variable voltage control causes at least one of the first and second motor generators to generate electricity, while at the same time, causing the engine to increase the output of the engine when the voltage of the battery is changed to a higher voltage.

4. The hybrid vehicle of claim 1, wherein
the variable voltage control causes at least one of the first and second motor generators to propel the vehicle, while at the same time, causing the engine to decrease the output of the engine when the voltage of the battery is changed to a lower voltage.

5. The hybrid vehicle of claim 1, wherein
the battery further includes a plurality of battery modules, with the battery being configured to change to a higher voltage by connecting the plurality of battery modules in series, and to change to a lower voltage by connecting the plurality of battery modules in parallel.

6. The hybrid vehicle of claim 1, wherein
the switch is a semiconductor switch.

7. The hybrid vehicle of claim 1, wherein
the first and second motor generators are mechanically coupled through one of a transmission and a clutch.

8. The hybrid vehicle of claim 1, wherein
the engine is mechanically coupled to the first and/or second motor generators.

9. The hybrid vehicle of claim 1, wherein
the first motor generator is coupled to a first set vehicle driving wheels and the second motor generator is coupled to a second set vehicle driving wheels.

10. A hybrid vehicle comprising:
an engine;
a motor generator;
a power supply line electrically connected to the motor generator;
a battery configured to change an output terminal voltage of the battery and connected via a switch to the electric power supply line; and
a variable voltage control configured to change the output terminal voltage of the battery by
    adjusting an output of the motor generator before opening the switch such that a charge/discharge current of the battery approaches zero,
    opening the switch in response to adjusting the output of the motor generator,
    changing the output terminal voltage of the battery,
    modifying an output of the engine based on an amount of change made in the output terminal voltage of the battery in response to opening the switch to adjust a voltage of the power supply line to reduce a voltage difference between the voltage of the power supply line and the output terminal voltage of the battery, and
    closing the switch.

11. The hybrid vehicle of claim 10, wherein
the variable voltage control is configured to adjust the voltage of the power supply line to reduce the voltage difference between the output terminal voltage of the battery and the voltage of the power supply line by adjusting an output of the motor generator.

12. The hybrid vehicle of claim 10, further comprising
a second motor generator coupled to the power supply line,
the variable voltage control being further configured to adjust the voltage of the power supply line to reduce the voltage difference between the output terminal voltage of the battery and the voltage of the power supply line by adjusting an output of the second motor generator.

13. The hybrid vehicle of claim 10, wherein
the variable voltage control controls an output of the motor generator such that the voltage of the power supply line becomes equal to the output terminal voltage of the battery before closing the switch.

14. The hybrid vehicle of claim 10, wherein
the variable voltage control controls the motor generator to generate electricity while increasing the output of the engine when the output terminal voltage of the battery is changed to an increased output terminal voltage.

15. The hybrid vehicle of claim 10, wherein
the variable voltage control controls the motor generator to output mechanical power and decrease the output of the engine when the output terminal voltage of the battery is changed to a decreased output terminal voltage.

16. The hybrid vehicle of claim 10, wherein
the battery is configured to change the output terminal voltage in steps.

17. The hybrid vehicle of claim 16, wherein
the battery further includes a plurality of battery modules, with the battery being configured to increase the output terminal voltage by changing the connection of two or more of the plurality of battery modules from parallel to series, and to decrease the output terminal voltage by changing the connection of two or more of the plurality of battery modules from series to parallel.

18. A method of operating a hybrid vehicle comprising:
adjusting a motor generator coupled to a power supply line before opening a switch that couples a battery to the power supply line such that a charge/discharge current of the battery approaches zero;
opening the switch in response to adjusting the motor generator;
changing a battery output terminal voltage of the battery;
modifying an output of an engine based on an amount of change made in the battery output terminal voltage in response to opening the switch to adjust a voltage of the power supply line to reduce a voltage difference between the voltage of the power supply line and the battery output terminal voltage; and
closing the switch.

19. The method of claim 18, wherein
adjusting the voltage of the power supply line to reduce the voltage difference between the voltage of the power supply line and the battery output terminal voltage further includes adjusting the voltage of the power supply line to reduce the voltage difference between the voltage of the power supply line and the battery output terminal voltage by adjusting a voltage output of a motor generator coupled to the power supply line.

20. The method of claim 18, wherein
adjusting the voltage of the power supply line to reduce the voltage difference between the voltage of the power supply line and the battery output terminal voltage further includes adjusting the voltage of the power supply line to reduce the voltage difference between the voltage of the power supply line and the battery output terminal voltage by adjusting an output of a motor generator coupled to the power supply line through adjusting the output of the engine mechanically coupled to the motor generator.

21. The method of claim 20, wherein
adjusting the voltage of the power supply line to reduce the voltage difference between the voltage of the power supply line and the battery output terminal voltage further includes controlling the motor generator to generate electricity while increasing the output of the engine when the battery output terminal voltage of the battery is changed to a higher output terminal voltage.

22. The method of claim 20, wherein
adjusting the voltage of the power supply line to reduce the voltage difference between the voltage of the power supply line and the battery output terminal voltage further includes controlling the motor generator to output mechanical power and decrease the output of the engine when the battery output terminal voltage of the battery is changed to a lower output terminal voltage.

23. The method of claim 18, wherein
changing the battery output terminal voltage of the battery further includes changing the battery output terminal voltage in steps.

24. A method of switching battery voltage comprising:
adjusting a motor generator coupled to a power supply line before opening a switch that couples a battery to the motor generator through the power supply line such that a charge/discharge current of the battery approaches zero;
opening the switch in response to adjusting the motor generator, the motor generator being mechanically coupled to an engine;
changing a battery output terminal voltage of the battery;
modifying an output of the engine based on an amount of change made in the battery output terminal voltage in response to opening the switch to adjust a voltage of the power supply line to reduce a voltage difference between the voltage of the power supply line and the battery output terminal voltage; and
closing the switch.

25. The method of claim 24, wherein
adjusting the voltage of the power supply line to reduce the voltage difference between the voltage of the power supply line and the battery output terminal voltage further includes adjusting the voltage of the power supply line to reduce the voltage difference between the voltage of the power supply line and the battery output terminal voltage by adjusting an output of the motor generator.

26. The method of claim 24, wherein
adjusting the voltage of the power supply line to reduce the voltage difference between the voltage of the power supply line and the battery output terminal voltage further includes controlling the motor generator to generate electricity while increasing the output of the engine when the battery output terminal voltage is changed to a higher output terminal voltage.

27. The method of claim 24, wherein
adjusting the voltage of the power supply line to reduce the voltage difference between the voltage of the power supply line and the battery output terminal voltage further includes controlling the motor generator to output mechanical power and decrease the output of the engine when the battery output terminal voltage is changed to a lower output terminal voltage.

* * * * *